United States Patent [19]
Bishop

[11] Patent Number: 5,417,080
[45] Date of Patent: May 23, 1995

[54] VEGETABLE CRISPER

[75] Inventor: Jerry W. Bishop, Atlanta, Ga.

[73] Assignee: Hydro-Crisper, Inc., Atlanta, Ga.

[21] Appl. No.: 181,894

[22] Filed: Jan. 14, 1994

Related U.S. Application Data

[63] Continuation-in-part of Ser. No. 911,186, Jul. 9, 1992, Pat. No. 5,303,563.

[51] Int. Cl.⁶ ............................................. F25D 17/02
[52] U.S. Cl. .................................. 62/376; 62/91; 62/382; 312/402
[58] Field of Search .................. 62/91, 376, 382; 312/402

[56] References Cited

U.S. PATENT DOCUMENTS

| | | | |
|---|---|---|---|
| 2,411,833 | 11/1946 | McMahon | 62/141 |
| 2,470,551 | 5/1949 | Fish | 62/141 |
| 2,560,057 | 7/1951 | Williams | 62/103 |
| 2,812,643 | 11/1957 | Worschitz | 62/104 |
| 3,364,694 | 1/1968 | Cohen et al. | 62/265 |
| 3,448,589 | 6/1969 | Marshall et al. | 62/376 |
| 3,600,905 | 8/1971 | Dymek | 62/382 |
| 3,834,178 | 9/1974 | Pink | 62/338 |
| 4,013,434 | 3/1977 | Kronenberger et al. | 62/382 |
| 4,567,732 | 2/1986 | Landstrom et al. | 62/91 |
| 4,860,555 | 8/1989 | Biship et al. | 62/382 |

Primary Examiner—Ronald C. Capossela
Attorney, Agent, or Firm—Kennedy & Kennedy

[57] ABSTRACT

A mist-emitting apparatus for a vegetable crisper, having a sprayer attached to an upper portion of a housing. A portion of the housing defines a closable reservoir for a supply of water. Means are provided in the housing for operatively communicating with a lower portion of the reservoir to communicate the water under pressure to the sprayer at predetermined intervals for a predetermined period of time. The water, being communicated to the sprayer, is emitted as a mist. A false bottom extends laterally from a lower portion of the housing for supporting fruits and vegetables above the false bottom. The closable container may be a bag or a cavity in the sidewall of the vegetable crisper, separate from the housing and communicating through a tube that connects with a lower portion of the housing. When originally installed in a refrigerator, the sprayer attaches to an interior wall and extends into a vegetable crisper drawer. A solenoid-actuated valve selectively communicates water to the sprayer from a pressurized supply of water.

12 Claims, 8 Drawing Sheets

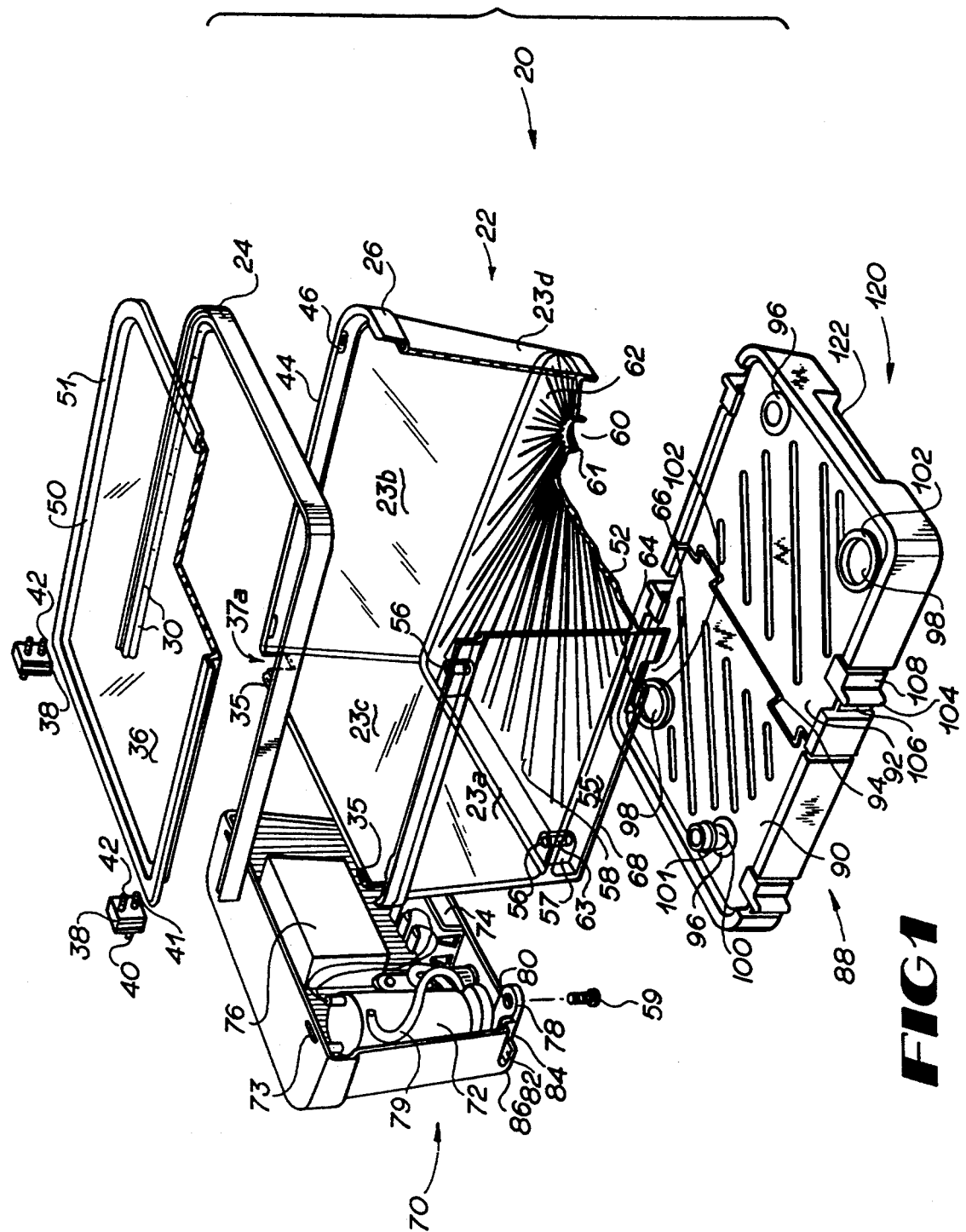

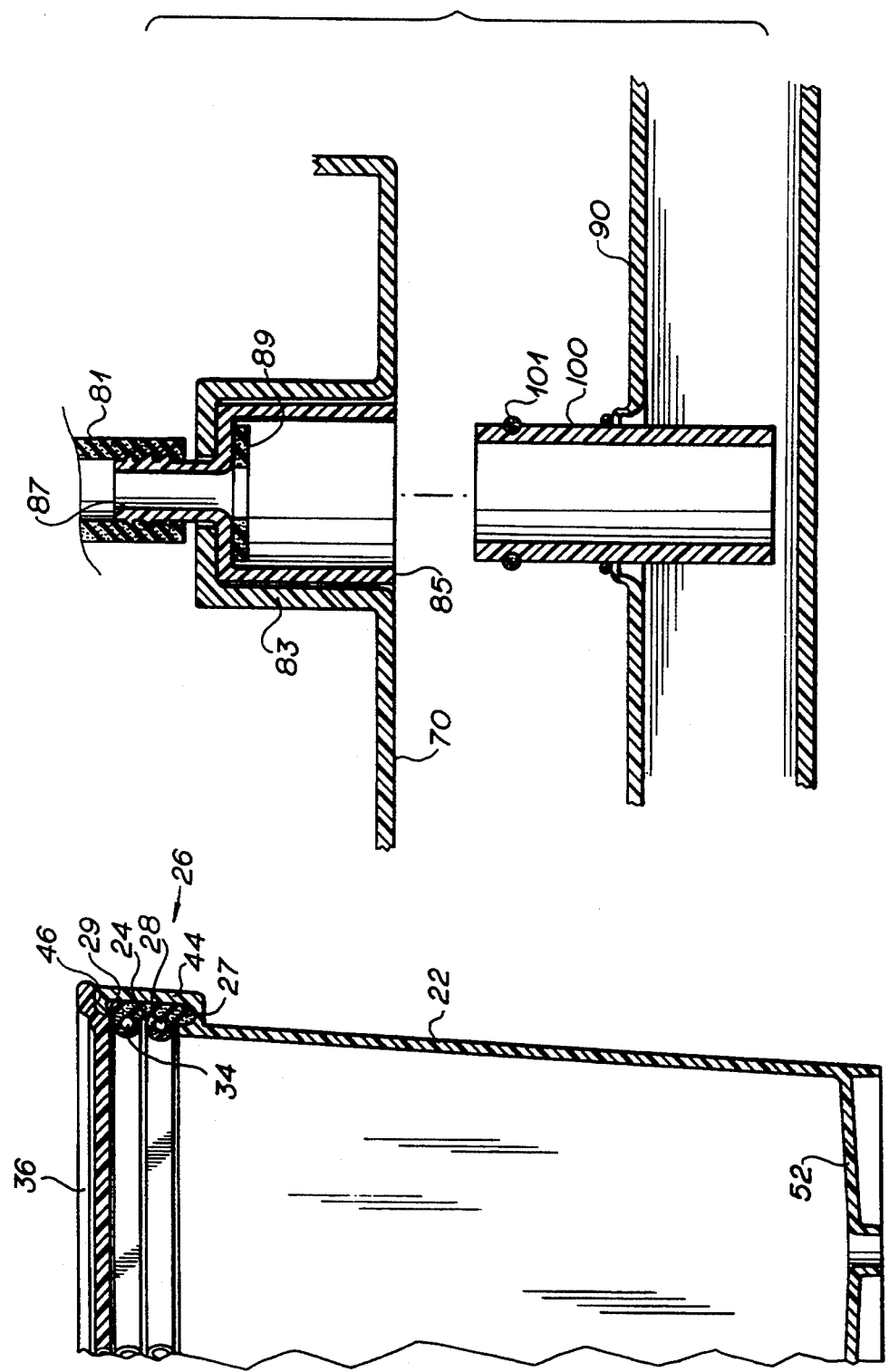

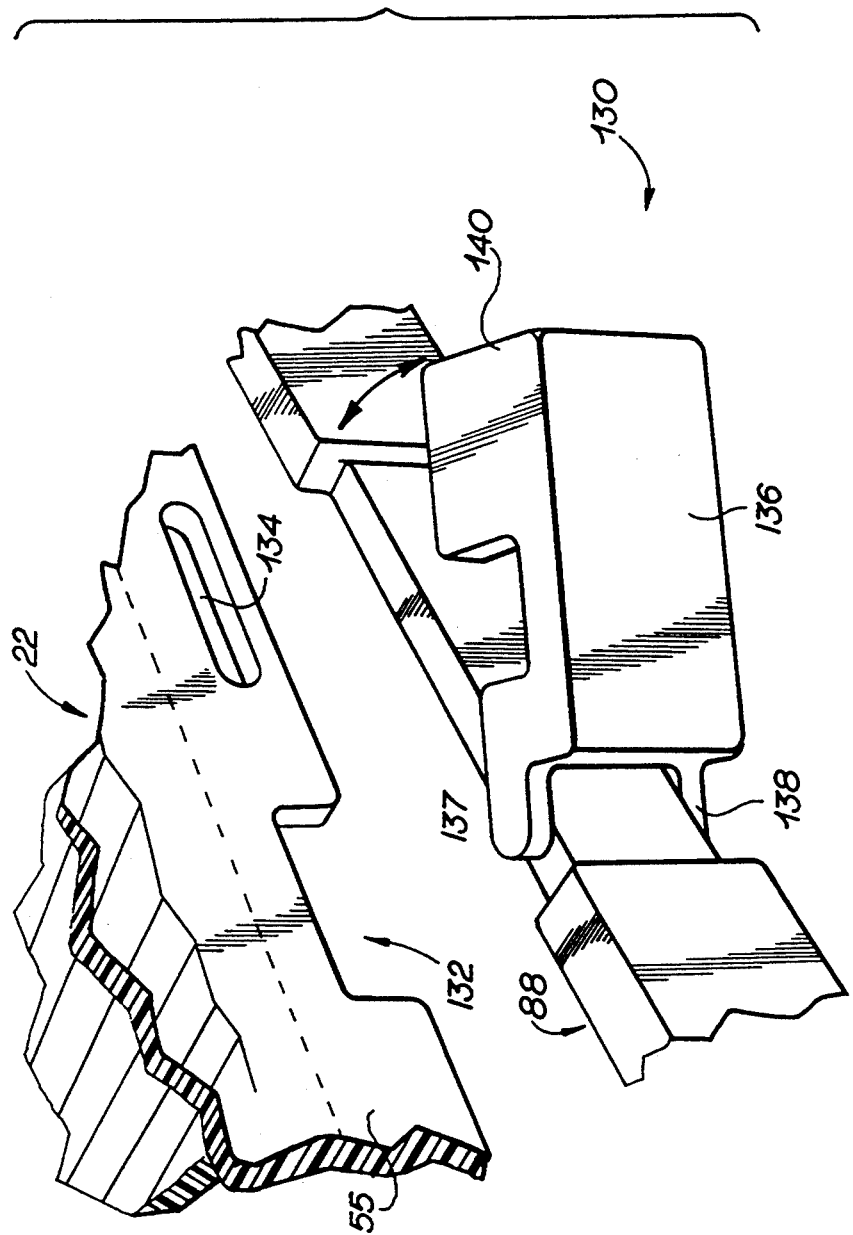

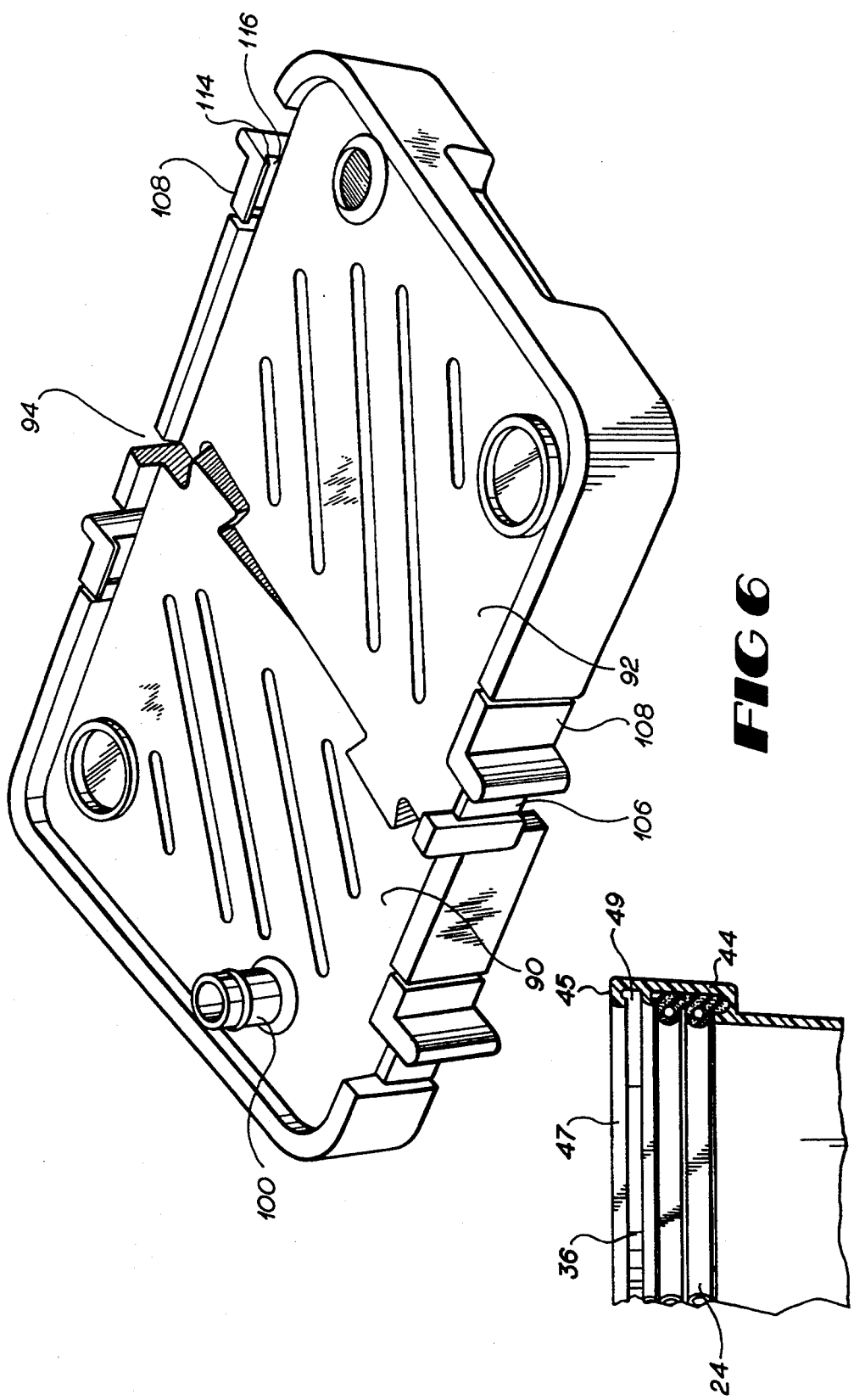

VEGETABLE CRISPER

This application is a continuation-in-part of U.S. patent application Ser. No. 07/911,186 filed Jul. 9, 1992 now U.S. Pat. No. 5,303,563.

TECHNICAL FIELD

The present invention relates to apparatus for storing fresh vegetables. More particularly, the present invention relates to a peripheral sprayer for an apparatus for storing vegetables to maintain freshness.

BACKGROUND OF THE INVENTION

Refrigeration has long been recognized as a primary mechanism for maintaining the freshness of vegetables. The cool air of a refrigerator or refrigerated container slows the biological and chemical process of decay. Temperature control however is but one facet of maintaining vegetables fresh. Dehydration is a principle mechanism of deterioration in quality and taste of stored refrigerated vegetables. The cool air, which is relatively dry, readily absorbs the water that transpires from the vegetables. The root system for a plant continually replaces such lost moisture. Once vegetables are harvested from a plant, however, it is important to minimize the loss of moisture while keeping the vegetables cool in order to maintain freshness.

Efforts have been made to reduce the loss of moisture from fresh vegetables held in cool rooms or refrigerators. For example, U.S. Pat. No. 4,860,555 issued to Bishop et al discloses a vegetable crisper comprising a container for receiving vegetables and adapted to sprinkle water periodically from a supply onto the vegetables. The sprinkler is mounted centrally within the container on a lower floor and projects upwardly to a position beneath the lid. A recirculation system filters the water within the container.

While such vegetable crisper successfully increases the storage life of fresh vegetables held in a refrigerator, the centrally disposed sprinkler presents several problems that reduce the usefulness of the crisper. The sprinkler interferes with access by a user into the container to place or to retrieve a particular vegetable. The sprinkler also occupies space in the container, which would otherwise be available for holding vegetables. The centrally disposed sprinkler may prevent storage of large vegetables which often must be cut into smaller pieces to fit in the container. Such cutting exposes additional surface area of the vegetable to cool air which leads to increased fluid loss from the vegetable with resultant loss of freshness. Also, the centrally disposed sprinkler requires routing a fluid communication tube from a side of the container into the center. Placing and storing vegetables in the container could interfere with the tube and possibly prevent the sprinkler from functioning as desired. Finally, there is no provision for only single use of the fluid sprayed on the vegetables. The reservoir initially holds fresh fluid, but as the apparatus operates, sprayed fluid flows from the vegetables back into the reservoir. Although a filter is provided, it is desirable that such used fluid be collected separately for disposal, so that materials that may be dislodged from the vegetable are not carried into the fresh supply of fluid.

Accordingly, there is a need in the art for an apparatus for maintaining the freshness of vegetables while providing increased access thereto, for using space in the container more efficiently to hold vegetables, for reducing interference between the vegetables and the apparatus during use, and for collecting spray fluid separately for disposal.

SUMMARY OF THE INVENTION

The present invention provides a mist-emitting apparatus for a vegetable crisper. The apparatus includes a housing having a sprayer attached to an upper portion of the housing. A portion of the housing defines a closable reservoir for a supply of water. Means are provided in the housing for operatively communicating with a lower portion of the reservoir to communicate the water under pressure to the sprayer at predetermined intervals for a predetermined period of time. The water, being communicated to the sprayer, is emitted as a mist.

More particularly described, the mist-emitting apparatus described above includes a false bottom that extends laterally from a lower portion of the housing. Fruits and vegetables are being supported on the false bottom above the water that collects below.

In another aspect, the mist-emitting apparatus for a vegetable crisper includes a housing for being received in a vegetable crisper and having a sprayer attached to an upper portion of the housing. A closable container separate from the housing provides a supply of water in communication through a tube that connects with a lower portion of the housing. Means are provided for communicating the water from the container to the sprayer under pressure at predetermined intervals for a predetermined period of time. The water, being communicated to the sprayer, is emitted as a spray.

In a preferred embodiment, the mist-emitting apparatus includes a false bottom that extends laterally from a lower portion of the housing. Fruits and vegetables, being supported on the false bottom, are held above the water that collects below.

In another preferred embodiment, a hanger attaches to the container to hold the container to a wall of the vegetable crisper.

In another aspect, the present invention provides a vegetable crisper for insertion into a refrigerator. The vegetable crisper is a container having sides and a bottom surface. A wall of the container includes a closable cavity for receiving a supply of water. A housing having a sprayer attached to an upper portion is disposed in the container and connected by a tube to the cavity. Means are provided for communicating the water from the cavity to the sprayer at predetermined intervals for a predetermined period of time. The water, being communicated to the sprayer, is emitted as a mist.

In another aspect, the present invention provides a mist-spraying apparatus disposed in a refrigerator that has at least a refrigerant apparatus for chilling air in an insulated chamber for maintaining articles at a chilled temperature and has a vegetable crisper drawer received in a portion of the chamber. The mist-spraying apparatus includes a crisper drawer adapted for being received in the refrigerator for holding fruits and vegetables. A sprayer attaches to an interior wall of the refrigerator and extends into a vegetable crisper drawer. A supply of water connects to the sprayer by a tube. Means are provided for communicating water under pressure to the sprayer at predetermined intervals for a predetermined period. The water, being communicated to the sprayer, is emitted as a mist into the vegetable crisper drawer.

In a preferred embodiment of the mist-spraying apparatus described above has a solenoid-actuated valve for selectively communicating water to the sprayer. The valve connects to a pressurized supply of water.

In a preferred embodiment, the container defining the crisper drawer includes an opening for receiving the sprayer that extends from the interior wall of the refrigerator. The opening may be a slot extending downwardly from an upper edge of the container.

In a preferred embodiment of the mist-spraying apparatus described above, the container includes a bottom that slopes to a drain for discharging water collected from the spray.

Objectives, features and advantages will become apparent from a reading of the following detailed description of the invention and claims in view of the appended drawings.

BRIEF DESCRIPTION OF THE DRAWINGS

FIG. 1 is an upper and right perspective, exploded view of a vegetable crisper constructed in accordance with the present invention.

FIG. 2 is an partial cross-sectional view of a side of the vegetable crisper illustrated in FIG. 1, with a view of a preferred ribbon-like sprayer seated on an upper peripheral edge.

FIG. 2A is a partial cross-sectional view of an alternate embodiment of the side of the vegetable crisper illustrated in FIG. 2.

FIG. 4 is a partial cut-away view illustrating the connection between the pump and a fluid supply reservoir for the vegetable crisper illustrated in FIG. 1.

FIG. 5A is a perspective cut-away view of a preferred latch for securing the reservoir to the chamber of the vegetable crisper.

FIG. 6 is a perspective view of the fluid supply reservoir and the fluid collector that connect together as a base for the vegetable crisper illustrated in FIG. 1.

DETAILED DESCRIPTION

Figure 5:
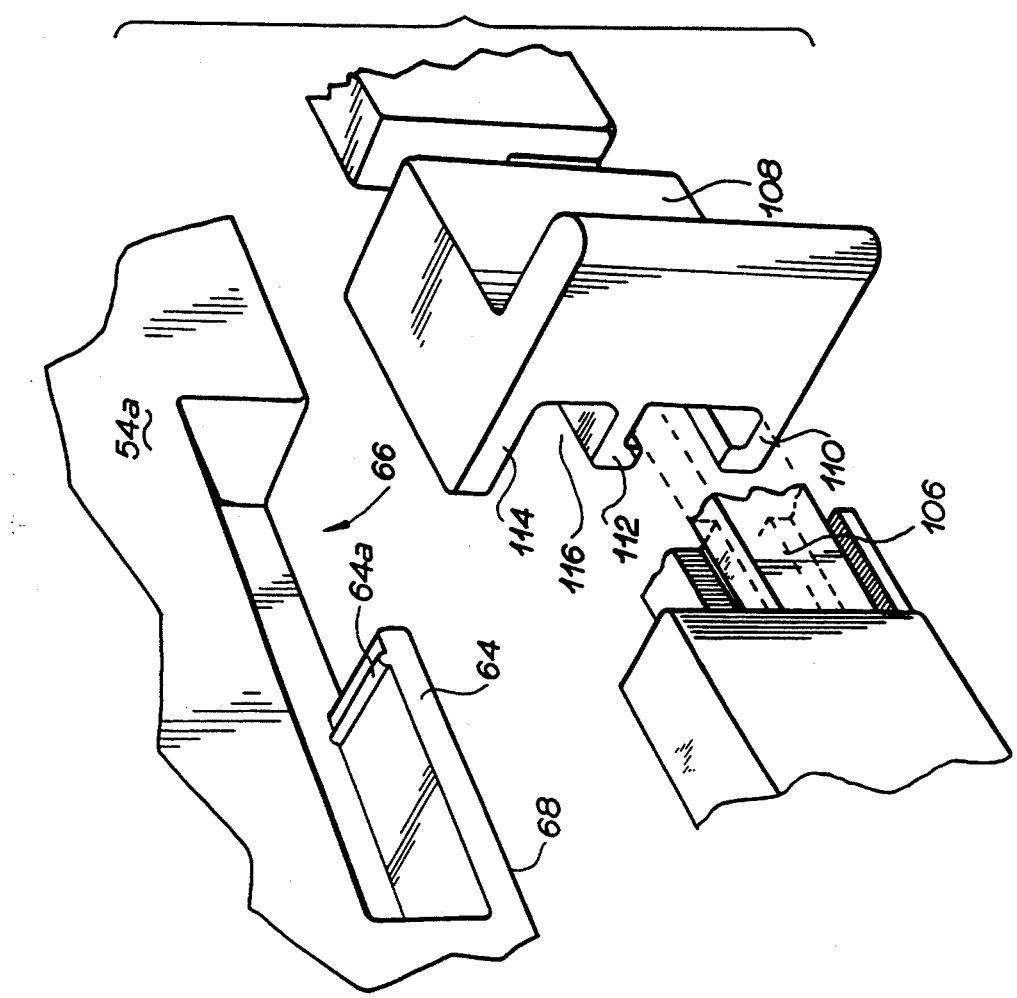
FIG. 5 is a side view of a tab on a container for holding vegetables and a latch on the reservoir that cooperate to interlock the reservoir with the chamber in the vegetable crisper 1.

Referring now in more detail to the drawings, in which like numerals indicate like parts throughout the several views, FIG. 1 shows an upper and right perspective view of a vegetable crisper 20 constructed in accordance with the present invention, with component parts exploded away for better illustration. Each of the component parts are discussed below. First, the vegetable crisper 20 comprises an open-ended container 22 with four sides 23a, 23b, 23c, and 23d for holding a plurality of vegetables, with a sprayer 24 seated on at least a portion of an upper periphery 26 of the container. For example, the sprayer 24 in the illustrated embodiment seats on the upper periphery of three sides 23a, 23d, and 23b of the container 22 to define a U-shape. The sprayer 24 emits a misty spray of fluid through orifices onto the vegetables in the container 22 to maintain the freshness of the vegetables therein. The sprayer 24 in a preferred embodiment is an extruded flexible member enclosing at least one elongate tubular tube 28, as illustrated in FIG. 2. The sprayer 24 has a lower projection 27 and an upper knob 29, for a purpose discussed below. A plurality of orifices 30 are formed in the sprayer 24 along at least a portion of the periphery 26. The orifices 30 may be slits or circular openings, and are preferably spaced about 2 to 5 inches apart. The tube 28 communicates a fluid from a supply (discussed below) for emitting through the orifices 30 as a spray into the interior of the container 22. In the illustrated embodiment, the sprayer 24 includes a second tube 34 which contains air. The second tube 34 facilitates seating of a lid 36 on the upper periphery 26 of the sprayer 24.

As best illustrated in cross-sectional view in FIG. 2, the upper periphery 26 of the container 22 defines a substantially L-shape ledge 44 in which the sprayer 24 rests. The lower projection 27 of the sprayer 24 seats in the ledge 44. A plurality of tabs 46 extend inwardly from an inner side of the ledge 44. In the illustrated embodiment, the tabs 46 are positioned near the tangent to the curved corners of the container 22, but other tabs 46 can be disposed between the corners. The tabs 46 overlap an upper portion of the sprayer 24 and press against the knob 29 to hold the sprayer 24 in the ledge 44. The sprayer 24 is thereby mechanically attached to the container 22.

Figure 3:
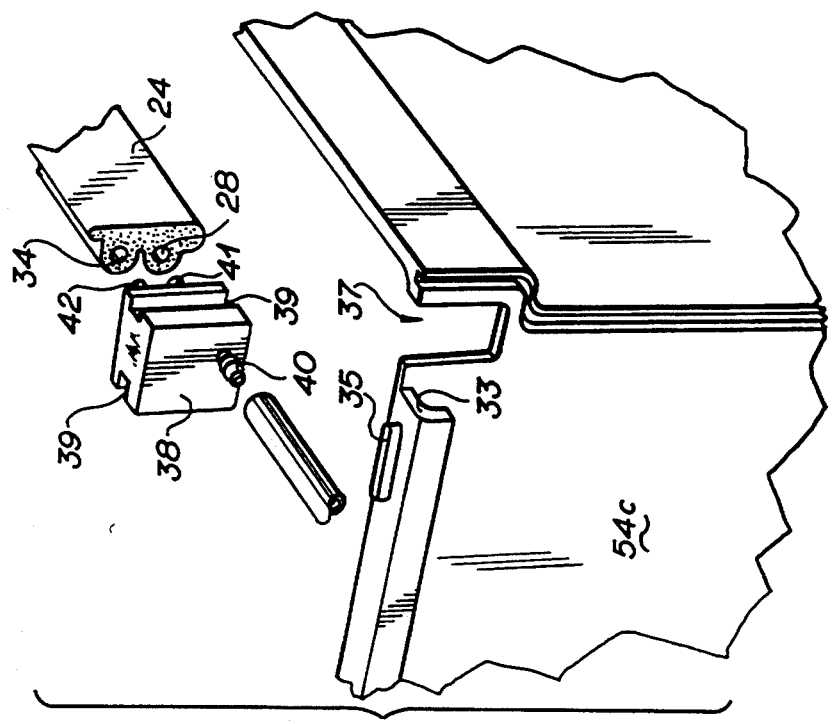
FIG. 3 is a perspective cut-away view of a connector between an outlet hose of a pump and the sprayer for the vegetable crisper illustrated in FIG. 1.

One end of the sprayer 24 communicates with a supply of fluids through a connector 38. As shown in FIG. 3, the connector 38 seats in a notch 37 in an upper corner of one side 23c of the container 22. The notch 37 holds a connector 38 for coupling one of the longitudinal ends of the sprayer 24 to an outlet hose of a pump (discussed below) that communicates fluid to the tube 28. The sides and the bottom of the connector 38 include a groove 39 for receiving the edges of the notch 37 in order to hold the connector in the notch. The connector 38 includes an inlet 40 that extends laterally from a first side. An outlet 41 and a plug 42 extend laterally from a second side. The inlet 40 and the outlet 41 communicate through a bore 43 defined in the connector 38. The plug 42 is closed. The inlet 40, the outlet 41 and the plug 42 are short tubes that are sized for being received by the tubes 28 and 34. The inlet 40 connects to a hose from the pump (discussed below) and the outlet 41 connects to the tube 28 for communicating fluid to the sprayer 24. The plug 42 inserts into the tube 34 to close it at the first end.

The second longitudinal end of the sprayer 24 also receives one of the connectors 38. At the second end, however, the connector 38 is rotated 180 degrees and inserted into a second notch 37a in the upper periphery of the side 23c. The plug 42 inserts into the tube 28 to close it. Pressurized fluid from the pump is thereby forced from the tube 28 through the orifices 30. The open outlet 41 is received by the tube 34, thereby permitting air to flow in and out of the tube, such as when the lid 36 is placed on the container 22 and removed therefrom.

The upper edge of the side 23c includes a transverse L-shaped flange 33 that extends out and downward for increased rigidity of the side. A pair of projections 35 (one of which is illustrated) extends upwardly from an upper surface of the flange for mating engagement with slots in a housing for the pump, as discussed below.

Turning again to FIG. 1, the lid 36 removably sits on the upper edge of the sprayer 24 to close the open container 22. In the illustrated embodiment, the lid 36 is a shallow dish having an upwardly extended perimeter edge 50 and outwardly extending flange 51. The lid 36 press-fits into the L-shaped ledge 44 of the upper periphery 26 of the container 22. The resilient sprayer 24 cooperates with the air-filled tube 34 to receive and cushion the lid 36 on the sprayer 24, and to make at least a partial seal therebetween. In an alternate embodiment illustrated in FIG. 2A, the ledge 44 on two opposing sides 23a and 23b includes an upwardly extending flange 45. A stop 47 extends upwardly from the third side 23c. A ridge 49 on each of two sides of the lid 36 slidably engage a respective one of the flanges 45 to hold the lid on the container 22. The stop 47 prevents the lid 36 from sliding too far on the container 22.

An alternate embodiment of the present invention provides a sprayer head that attaches to the upper periphery of the side 23c, with at least one orifice for spraying fluid across the container 22. In this alternate embodiment, the connector 38 comprises the sprayer head, that is held in the notch 37, preferably centrally disposed on the upper periphery of the side 23c. The inlet 40 connects with the tube from the pump, and the outlet 41 is shaped to emit a stream or spray across the container 22. The lid 36 seats on the ledge 44, but if desired, a flexible gasket could be seated on the ledge for forming a better seal between the lid 36 and the container 22. It is noted here that an air-tight seal between the lid 36 and the container 22 is not necessary or preferred. For example, in the embodiment illustrated in FIG. 1, the sprayer 24 forms a gasket on three of the four sides 23.

The container 22 is adapted for holding a plurality of vegetables. FIG. 2 shows a partial cross-sectional view of the side 23b of the container 22 which includes a bottom 52 from which the four sides 23 extend upwardly. In the illustrated embodiment, the four sides 23 angle outwardly from the bottom 52 to the upper periphery 26. The angle is preferably about 3 degrees from perpendicular. The bottom 52 is vertically spaced from a lower edge 53 of the container 22, and a lower portion 55 of the sides 23 forms a skirt that extends downwardly from the bottom. A plurality of ridges 58 in the bottom 52 radiate from an opening 60 near one corner of the container 22. The ridges 58 define channels 62 therebetween, and the bottom 52 preferably slopes generally from the sides 23 to the opening 60. Fluid that collects on the bottom 52 is thereby directed along the channels 62 to the opening 60 for discharge from the container 22. The ridges 58 further hold the vegetables out of such collected fluids on the bottom 52. An annular neck 61 extends downwardly from the opening 60, for a purpose discussed below.

The container 22 includes a pair of bosses 56 in the lower skirt portion 55 of one side 23c, for a purpose discussed below. Each boss 56 comprises a pair of vertical flanges 57 that extend inwardly from the side 23c under the bottom 52. The boss 56 in the illustrated embodiment includes an open-ended cylinder 63 between the flanges 57. A self-threading screw 59 is threadingly received by the boss 56 as discussed below.

The container 22 joins to a base 88 of the vegetable crisper 20 with a plurality of tabs 64 (best illustrated in FIG. 5) that engage latches as discussed below. Each tab 64 extends outwardly from a notch 66 in the lower skirt portion 55 on two opposing sides 23a and 23b of the container 22. A ridge 64a acts as a stop to restrict unintentional movement of the latch from a locked position. One side 23a has a single notch 66 and tab 64 while the opposite side 23b has a pair of the notches and tabs. One of the pair are located near the lateral edges of the side 23b. The notch 66 on the side 23a is offset from the middle of the side, and in the illustrated embodiment, is offset from the side 23d approximately one third of the longitudinal length of the container 22.

A housing 70 attaches to one side 23c for enclosing a pump 72, a battery 74, and a controller 76 for operating the vegetable crisper 20. The controller may be of conventional design, having a timer or an electronic logic circuit operating as a timer, to activate the pump 72 at selected intervals. The housing 70 has a pair of tabs 78, each with a hole 80 therethrough for receiving the self-threading screw 59. The tabs 78 extend laterally from a bottom edge of the housing 70. The tabs 78 matingly engage a respective one of the bosses 56 in the lower portion 55 of the side 23c. The screw 59 passes through the hole 80 and threadingly engages the boss 56 to rigidly connect the housing 70 to the container 22. The upper surface of the housing 70 includes a pair of slots 73 which matingly receive the projections 35 on the side 23c of the container 22. This interlocking engagement assists joining the housing to the container 22.

The electrically operated pump 72 is driven by the battery 74 mounted inside the housing 70. In an alternate embodiment, adapters are provided for operating the pump 72 with conventional alternating current or with a 12 volt supply, such as in a car or boat. A first end of a hose 79 connects to the output side of the pump 72 and a second end of the hose connects to the inlet 40 of the connector 38. A second hose 81 extends downwardly from an inlet for the pump 72, as discussed below for communication with the supply of fluid.

A tab 82 extends outwardly from a notch 84 at the lower peripheral edge on a side 86 of the housing 70, for a purpose discussed below. The tab 82 and the notch 84 are similar to the tab 64 and the notch 66 discussed above and illustrated in FIG. 5.

FIG. 4 is a partial cut-away view of the housing 70 showing the connection between the pump 72 and a fluid supply reservoir 90, discussed below. The bottom of the housing 70 includes a raised annular platform 83 having a central hole. An annular funnel 85 having an elongate tube 87 is inverted and inserted into the platform 83 with the tube 87 extending upwardly through the central hole thereof. The hose 79 is received by the tube 87 and connects with the inlet of the pump 72. As discussed below, the funnel 85 receives a tube 100 that extends upwardly from the fluid supply reservoir 90 for communicating fluid to the pump 72. In the illustrated embodiment, the interior of the funnel 85 includes a resilient gasket 89 for sealing the connection between the tube 100 and the funnel.

Returning to FIG. 1, the vegetable crisper 20 also includes a base 88 that comprises the fluid supply reservoir 90 (mentioned above) and a waste fluid collector 92. The reservoir 90 and the collector 92 are substantially rectangular enclosures for holding fluids. The reservoir 90 and the collector 92 twist together with a tongue and groove connection 94 as best illustrated in FIG. 6. The top surface of the reservoir 90 and the collector 92 each include a pair of openings 96 and 98. The tube 100 (best illustrated in FIG. 4) extends upwardly from the opening 96 in the reservoir 90, and is sized for inserting into the annular funnel 85 in the bottom of the housing 70. The diameter of the tube 100 is sized for fitting firmly through the opening 96. The tube 100 is secured in place with an appropriate food-grade adhesive. A screen (not illustrated) may be secured in the tube 100 to filter the fluid communicated to the sprayer 24. An O-ring 101 is received in a groove that extends around the circumference of the tube 100. The O-ring 101 seals the connection between the tube 100 and the annular funnel 85.

The opening 98 preferably has a diameter larger than that of the first opening 96, and is closed by a removable cap 102. The larger opening 98 facilitates filling the reservoir 90 with fluids prior to using the vegetable crisper 20. The larger opening 98 in the collector 92 similarly is closed by a removable cap 102. The larger opening 98 facilitates draining the waste fluids that collect in the collector 92 and washing the collector 92. The smaller opening 96 in the collector 92 receives the annular neck 61 that extends downwardly from the opening 60 in the bottom of the container 24, as discussed above. The annular neck 61 communicates fluids into the collector 92 through the opening 96.

A slidable latch 104 is mounted on each of two opposing sides 106a and 106b of the reservoir 90 and the collector 92. The latches 104 (best illustrated in FIG. 5) engage the tabs 64 and 82 on the container 22 and the housing 70, respectively, to fixedly secure the base 88 to the container 22. One of the latches 104 on the reservoir 90 engages the tab 82 on the housing 70. The other latches 104 on the reservoir 90 and on the collector 92 engage the tabs 64 on the container 22. In the illustrated embodiment, a wide T-flange 106 extends laterally from the container 22. A slidable plate 108 is received on the T-flange. The plate 108 includes three hook-like flanges 110, 112, and 114 that extend laterally from one side of the plate. The flanges 110 and 112 face each other and engage the wings of the T-flange 106 for slidable movement of the plate 108 on the T-flange 106. The flange 114 faces the back side of the flange 112, and cooperates therewith to define a channel 116. The base 88 is secured to the container 22 by moving the plate 108 from a first unlocked position to a second locked position. During this movement, the tabs 64 and 82 are each received in one of the channels 116, thereby securely connecting the container 22 to the base 88.

FIG. 5A is a perspective cut-away view of a preferred latch generally designated 130 for connecting the container 22 to the base 88. The lower portion 55 includes a "vertical" notch 132 and a spaced-apart slot 134 instead of the combined "horizontal" notch 66 and tab 64. Thus the side 23a has a single notch 132 and slot 134 while the side 23b has a pair of the notches 132 and slots 134. The housing 70 includes a similar notch 132 and slot 136 instead of the tab 82 and the notch 84 on the lower peripheral edge of the side 86.

The base 88 includes four latches 136. Each latch 136 pivotally connects at 137 in a respective cut-out 138 on the base 88 which cut-out is in correspondence with one of the notches 132 and slots 134. A tongue 140 extends inwardly from the latch 136 for engaging the respective slot 134. The notch 132 permits the latch 136 to pivot at 137 against the lower side 55 of the container 22. The latch 136 pivots from a first outward unlatched position to a second inward latched position. With the container 22 sitting on the base 88, the latch 136 is pivoted and the tongue 140 enters the slot 134 to secure the base 88 to the container 22.

The lateral side 120 of each of the reservoir 90 and the collector 92 includes an exterior handle 122 for hand carrying the assembled vegetable crisper 20.

The vegetable crisper 20 is assembled for use by first placing the sprayer 24 in the ledge 44 and sliding the end of the tube 28 onto the outlet 41 of the connector 38. The second end of the tube 28 is closed by inserting the tube onto the plug 42 of a second connector 38. The hose 79 is connected between the outlet of the pump 72 and the inlet 40 of the first connector 38. The hose 81 is connected between the inlet of the pump 72 and the tube 87 of the inverted funnel 85. The pump 72, the battery 74, and the controller 76 are mounted in the housing 70 and appropriate control wires are connected therebetween to operate the pump and the controller. The container 22 is placed next to the housing 70 with the bosses 56 positioned on the tabs 78 of the housing. The slots 73 in the housing 70 receive the projections 35 on the side 23c. The self-threading screws 59 are then inserted through the hole 80 in the tabs 78 and are threadingly engaged with the bosses 56 to rigidly connect the housing 70 to the side of the container 22.

To use the vegetable crisper 20, the reservoir 90 is first filled with water through the large opening 98. The cap 102 closes the opening 98. The reservoir 90 and the collector 92 are then interlocked with the tongue and groove connector 94. Next, the container 22 with the housing 70 attached thereto is positioned on the reservoir 90 and the collector 92. In the embodiment illustrated in FIG. 1, the tabs 64 and 82 are aligned with the latches 104 and the tube 100 is received in the annular funnel 85 in the housing 70. The plates 108 are moved laterally on the T-flange 106 from a first unlocked position to a second locked position. Each of the tabs 64 are aligned with a respective one of the flanges 106. Sliding the plate 108 engages the tabs 64 and 82 in the channels 116 in order to lock the base 88 to the container 22.

In the embodiment illustrated in FIG. 5A, each of the notches 132 and slots 134 on the container 22 (and the housing 70 attached thereto) align with one of the latches 136 on the base 88. Each latch 136 is pivoted from the first outward position to the second inward position against the lower side 55 of the container 22. As a result, the tongues 140 grippingly enter the slots 134 to secure the base 88 to the container 22.

Vegetables may then be placed on the bottom 52 of the container 52 and the lid 36 is placed on the sprayer 24 to close the container. The vegetable crisper 20 is then operated, preferably by using a switch to start the controller. The pump is then operated at predetermined intervals for a predetermined duty cycle. It is contemplated that a duty cycle of approximately three to eight seconds at about two or three hour intervals wets the vegetables sufficiently to maintain freshness. A second override switch permits a user to activate the pump selectively and independently of the duty cycle. The user may thereby wet the vegetables just after placing them inside the container 22.

The pump 72 in operation draws fluid from the reservoir 90 through the tube 100. The fluid is pumped through the inlet 40 of the connector 38 into the sprayer 24. The fluid is communicated under pressure through the tube 28 and emitted into the container 22 as mist through the orifices 30, thereby wetting the vegetables. The fluid drips off of the vegetables to the bottom 52. The fluid then flows in the sloping channels 62 to the opening 60 where the fluid is drained through the neck 61 into the collector 92. In this manner, the vegetables are maintained wet. The container 22 and the lid 36 in a preferred embodiment is formed of a transparent plastic to allow inspection of the vegetables in the container and to allow a user to know whether the pump is operating. As needed, the user lifts the lid 36 and removes a selected vegetable.

Periodically the user disassembles the vegetable crisper 20 to re-fill the reservoir 90 and to discharge collected waste fluids from the collector 92. This is done by first detaching the base 88 from the container 22 by releasing the latches 104 from engagement with the tabs 64 and 82. The fluid in the collector 92 is drained through the opening 98 after removing the cap 102. The reservoir 90 is filled, and the vegetable crisper 20 is returned to operation as discussed above.

Figure 7:
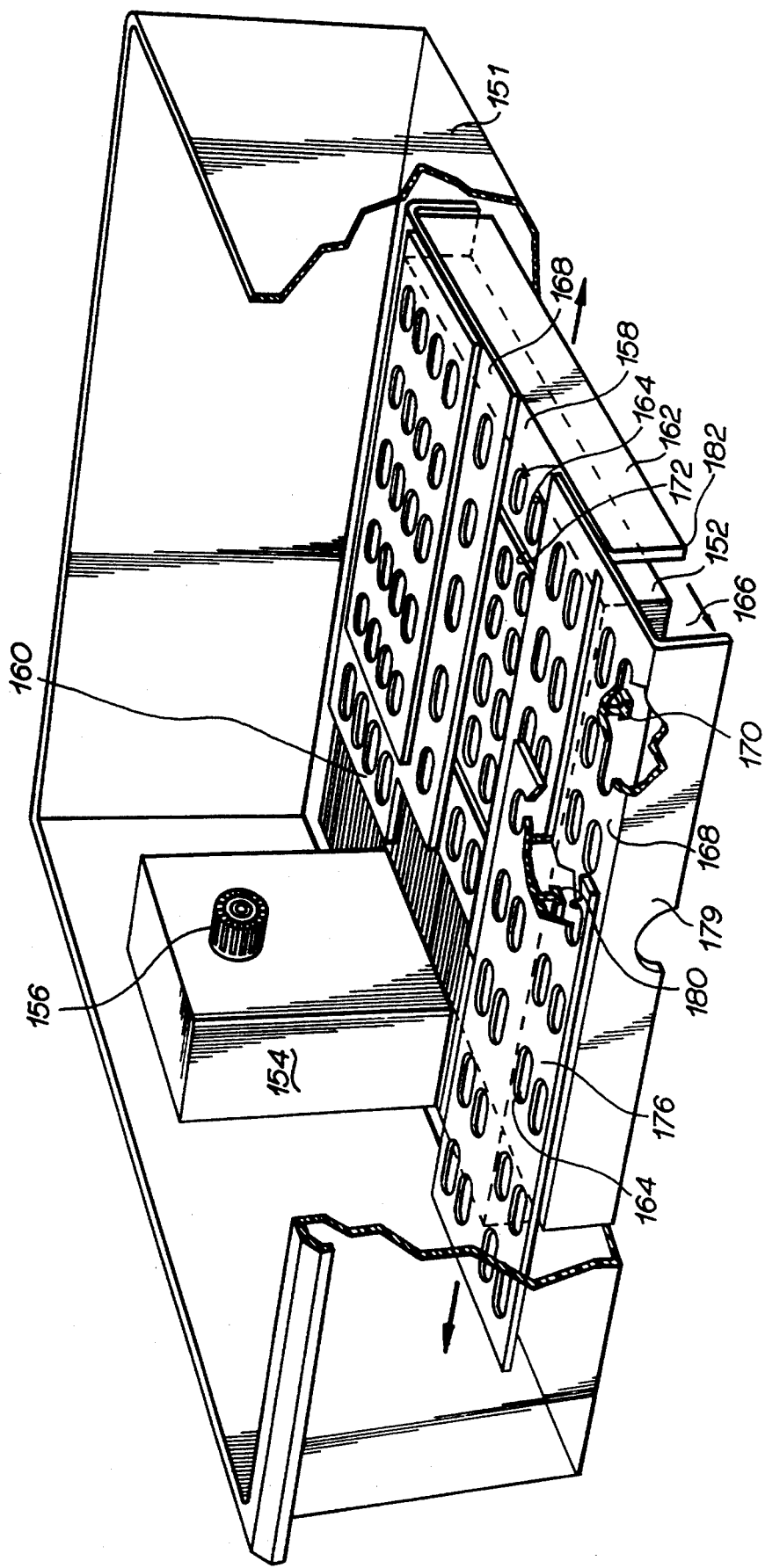
FIG. 7 is a perspective view of an alternative embodiment of the present invention for use in a vegetable drawer of a refrigerator.

FIG. 7 is a perspective view of a vegetable crisper 150 constructed in accordance with the present invention, especially for use in a vegetable drawer 151 of a refrigerator (not illustrated). The vegetable crisper 150 comprises a reservoir 152 for holding a supply of fluid. A housing 154 extends upwardly from the reservoir 152 at a first end. Although not illustrated, the housing 154 encloses the pump 72, the battery 74 and the controller 76, discussed above. The inlet of the pump 72 connects to the tube 100 extending upwardly from the supply reservoir 152, as similarly illustrated in FIG. 4 and discussed above with respect to the reservoir 90 for the embodiment illustrated in FIG. 1. The outlet of the pump 72 connects to a sprayer 156 mounted near an upper end of the housing 159.

A false bottom 158 slidably sits on the reservoir 152 for relative longitudinal movement therewith. Vegetables sit on the upper surface of the false bottom 158. A notch portion 160 enables the false bottom 158 to fit around the housing 154. An elongated flange 162 extends downwardly from an opposite edge of the false bottom 158 for supporting the plate when extended longitudinally from the reservoir 152. The false bottom 158 includes a plurality of spaced apart openings 164. Fluid from the wetted vegetables flows through the openings 164 into a collection area generally designated 166 between the bottom of the vegetable drawer 151 and the false bottom 158. A portion of the false bottom 158 covers the reservoir 152 which preferably is sloped to facilitate drainage of fluid off of the reservoir.

Vegetable drawers in different refrigerators vary in size, so the false bottom 158 preferably is adjustable to cover different surface areas. In the illustrated embodiment, a pair of first plates 168 slidably engage the false bottom 152 for transverse movement therewith. A pair of spaced-apart ribs 170 projects downwardly from a bottom surface of the plate 168. Each of the ribs 170 inserts into a channel 172 in the upper surface of the false bottom 152. The channels 172 guide the lateral travel of first plate 168 with respect to the false bottom 152. The first plate 168 includes a plurality of openings 164 to permit flow of fluid into the collection area 166. An elongated flange 179 extends downwardly from one side of the first plate 168 for supporting the first plate when it is extended laterally from the false bottom 152.

A second plate 176 slidably engages each of the first plates 168 for longitudinal movement therewith. At least one rib 180 extends downwardly from a bottom surface of the second plate. The rib 180 inserts into a channel 182 in the upper surface of the first plate 168. The channel 182 guides the longitudinal travel of the second plate 176 with respect to the first plate 168. The second plate 176 includes a plurality of the openings 164 to permit flow of fluid into the collection area 166.

The operation of the vegetable crisper 150 is similar to that described above for the vegetable crisper 20 illustrated in FIG. 1. The reservoir 152 is filled with water and the housing 154 is attached to the reservoir so that the pump 72 communicates through the tube 100 with the reservoir. The vegetable crisper 150 is placed on the bottom of the vegetable drawer 151.

The pair of first plates 168 are joined to the false bottom 158 by inserting the ribs 170 into the channels 172. One of the second plates 176 is joined to each of the first plates 168 by insert the rib 180 into the channel 182. The false bottom 158 is placed on the reservoir 152 in the vegetable drawer 151. The false bottom 158 is then moved longitudinally with respect to the reservoir 152 until the flange 162 is next to the end wall of the vegetable drawer 151. The first plates 168 are then moved laterally with respect to the false bottom 158 until the flanges 174 are next the respective side wall of the vegetable drawer 151. The second plates 176 are then moved longitudinally with respect to the first plates 168 towards the end wall of the vegetable crisper near the housing 154. In this manner, the open areas of the vegetable drawer 151 are covered by the false bottom 158 and the plates 168 and 176 to provide a surface on which vegetables may be placed.

The controller for the pump 72 is then started. At predetermined intervals, the pump 72 is operated to communicate fluid from the reservoir 152 to the sprayer 156. The fluid is sprayed over vegetables in the vegetable drawer for wetting thereof to maintain freshness. The fluid drips through the openings 164 into the collection area 166 between the vegetable crisper 151 and the surface defined by the false bottom 158 and the plates 168 and 176. On occasion, the vegetable drawer 151 is removed from the refrigerator. The vegetable crisper 150 is removed and the collected fluid poured out of the vegetable drawer 151. The reservoir 152 is refilled and replaced in the vegetable drawer 151 as discussed above.

In an alternate embodiment (not illustrated), the false bottom includes a pair of guides extending upwardly on the transverse sides. The guides slidingly receive the first plate 168 for relative transverse movement therewith. The guides are facing L-shaped flanges which each receive an edge of the first plate. The first plate 168 further includes a pair of similar guides that extend upwardly along the longitudinal edges of the first plate. The guides slidingly receive the second plate 176 for relative longitudinal movement therewith.

Figure 8:
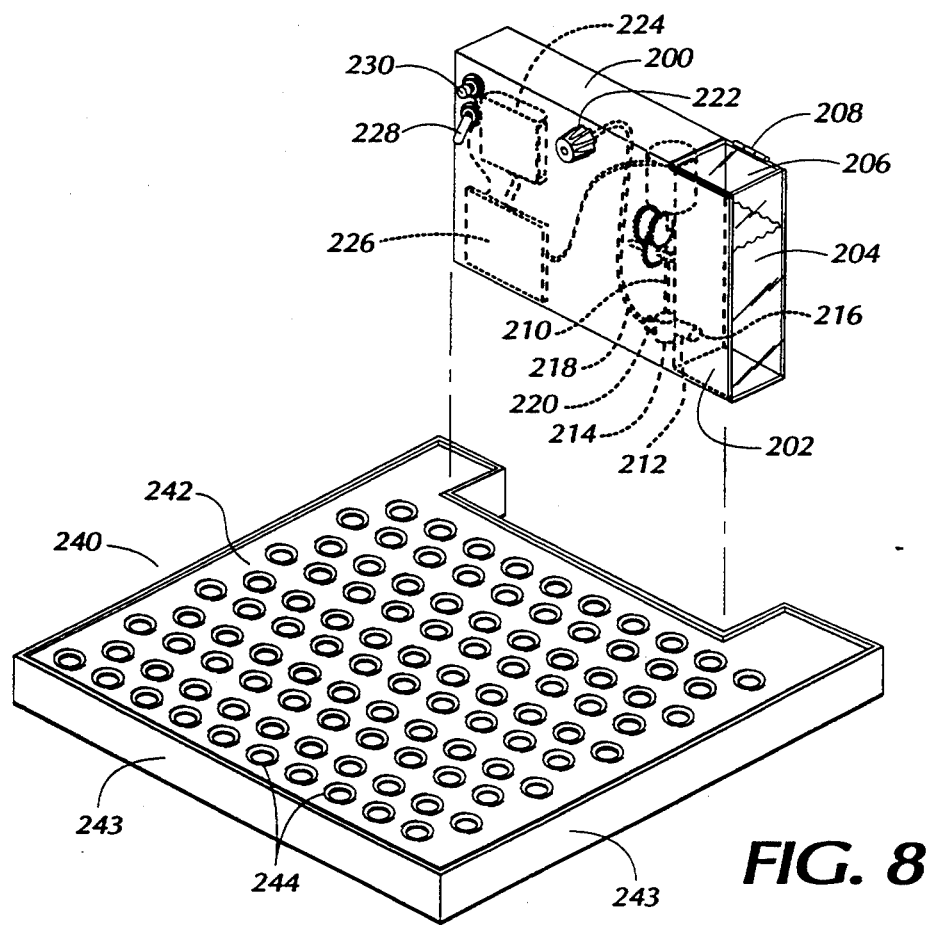
FIG. 8 is a perspective cut-away view of a mist-emitting apparatus according to the present invention for use in a vegetable drawer of a refrigerator.

FIG. 8 is a perspective cut-away view of a mist-emitting apparatus having a housing 200 for use in a vegetable crisper to maintain the freshness of fruits and vegetables held therein. The housing 200 inserts into a vegetable drawer of a refrigerator or inserts into a portable closable container for vegetables for carrying to picnics or in a car. The housing 200 includes a water reservoir 202 in a side portion of the housing. One side 204 preferably made of a transparent or translucent material for viewing the level of water in the reservoir. The water reservoir 202 is closed by a lid 206 that attaches with a hinge 208 to a back side of the housing 200. The housing 200 includes a pump 210 with a tube 212 that connects to an intake 214 of the pump. The tube 212 also connects to a lower portion 216 of the reservoir 202 for communicating water from the reservoir to the pump. A second tube 218 connects between an outlet 220 of the pump 210 and a sprayer 222 mounted at an upper portion of the housing 200.

The housing 200 holds a power supply 224 for operating the pump. In a preferred embodiment, the power supply comprises batteries held in a conventional tray. A portion of the housing 200 removably attaches, for example, with screws, snaps or slidably, for access into the housing in order to replace batteries and access the mechanical components. A timer 226 connects to the power supply and to an on/off switch 228. An override switch 230 also mounts to the housing 200 and connects to the timer 226. The timer 226 actuates the pump 210 at predetermined intervals for a predetermined period of time. The circuitry for such timer is conventional and is readily designed by one of ordinary skill in the art.

Exploded from the housing 200 is a false bottom 240 that inserts into a vegetable crisper. The false bottom 240 has a surface 242 on which the fruits and vegetables sit. Side skirts 243 extend downwardly from the surface 242 to define an area below the surface to collect water. The vegetables sit on the ridges of the false bottom 240 above the water that collects in the channels. The false bottom preferably includes openings 244 through which the misted water from the sprayer 222 drains below the false bottom. In the illustrated embodiment the false bottom 240 includes a notch 246 in one side, which nestingly receives a lower portion of the housing 200. In an alternate embodiment, the false bottom is defined by a plurality of spaced apart ridges and valleys.

Figure 9:
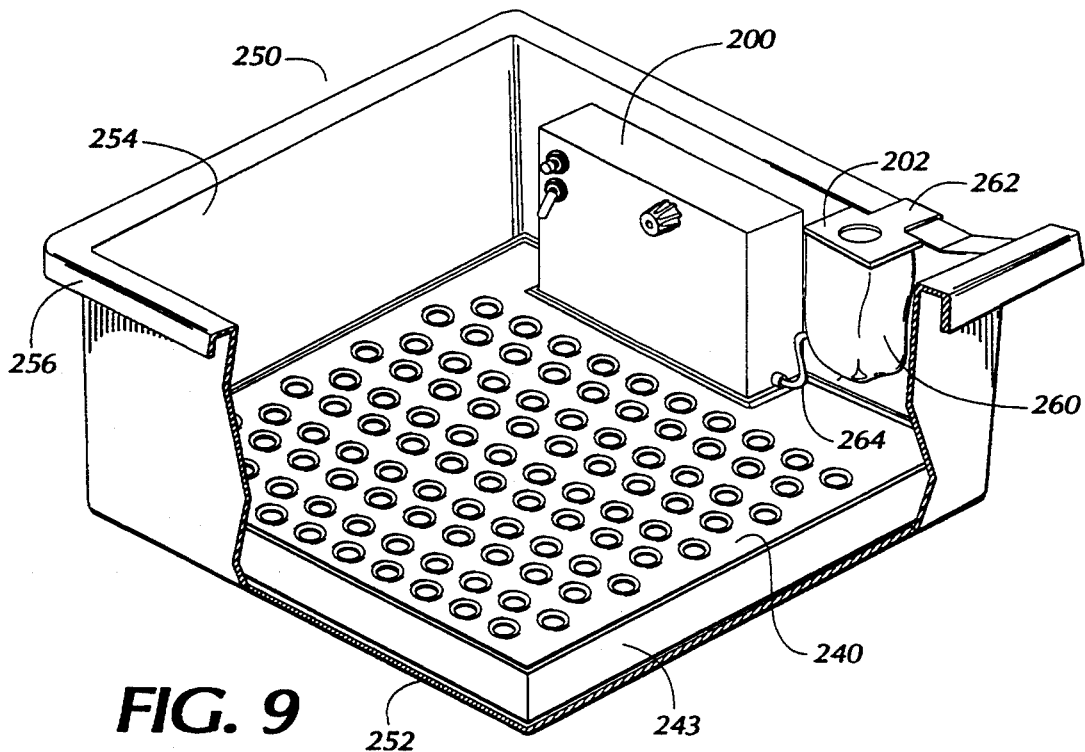
FIG. 9 is a perspective view of an alternate embodiment of the apparatus illustrated in FIG. 8, in which the water supply reservoir is separated from a housing for the sprayer.

FIG. 9 is a perspective view of an alternate embodiment of the apparatus illustrated in FIG. 8, in which the water reservoir 202 is separated from the housing 200 for the sprayer 222. The housing 200 inserts into a crisper drawer 250 having a bottom 252 and sides 254. In the illustrated embodiment, the sides 254 include U-shaped flanges 256 for receiving support rails in a refrigerator. Other conventional means can be used for slidably receiving the crisper drawer 250 in a refrigerator. In the embodiment illustrated in FIG. 9, the reservoir of water is a soft-sided bag 260 having a U-shaped hook 262 to secure the bag to the side 254. The bag 260 is filled with water. A tube 264 extends from a lower portion of the bag 260 to the intake 214 of the pump 210 in the housing 200. The false bottom 240 inserts into the vegetable crisper drawer 250 for supporting the vegetables above the water that collects in the crisper drawer 250 below the false bottom.

Figure 10:
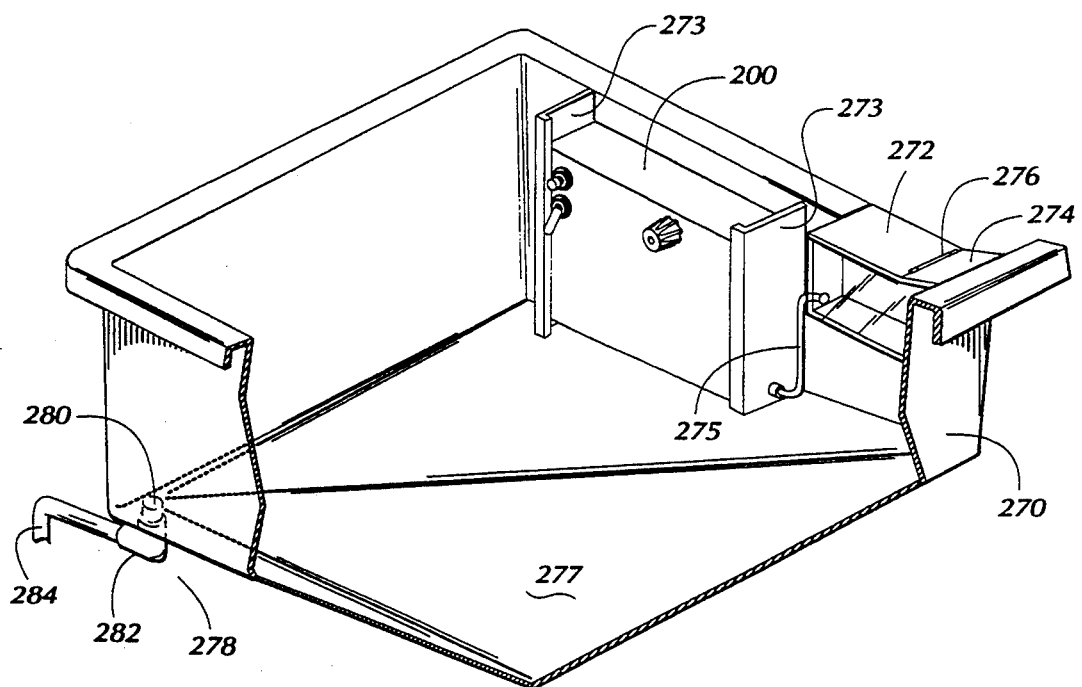
FIG. 10 is a perspective view of a vegetable crisper drawer having a cavity in a side wall for a water supply reservoir.

FIG. 10 is a perspective view of a vegetable crisper drawer 270 having a cavity 272 in a side wall for holding a supply of water. The housing 200 with the pump 210, the timer 226, and the sprayer 222 inserts into the drawer 270. The drawer 270 includes flanges 273 that extend from a side wall. The flanges 273 grippingly holds the housing 200 in the drawer. The cavity 272 includes a lid 274 with a hinge 276. In an alternate embodiment the cavity could be closed by a snap-on cap (not illustrated). A tube 275 connects between a lower portion of the cavity 272 to the intake 214 of the pump 210. In the illustrated embodiment a bottom 277 in the crisper drawer 270 preferably slopes to a drain 278 in a lower portion of the crisper drawer. The drain includes an opening 280 with a tube 282 extending outwardly of the crisper drawer. The tube 282 matingly engages a tube 284 in the refrigerator which communicates with a drain or a conventional drip pan disposed below the refrigerator. In an alternate embodiment of the vegetable crisper 270 for retro-fitting an existing refrigerator, the vegetable crisper does not include the drain 278.

Figure 11:
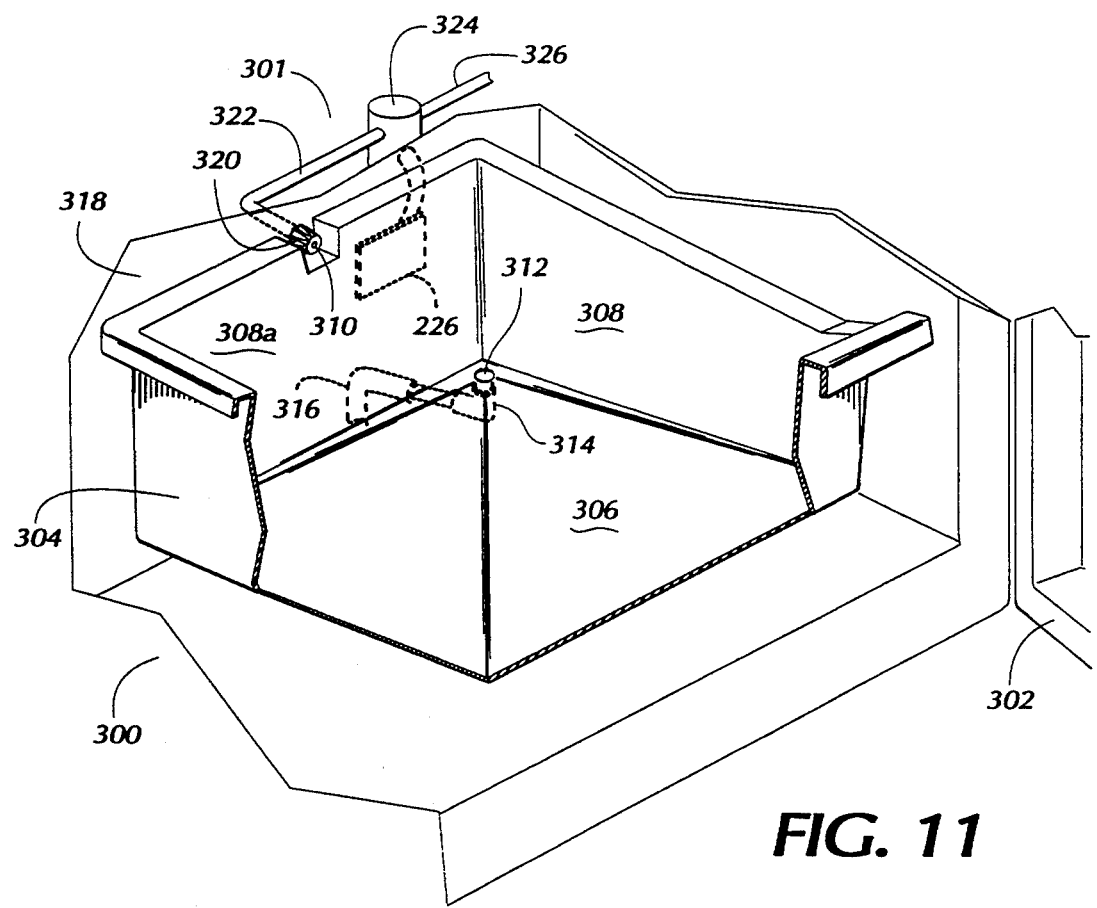
FIG. 11 is a perspective view of a refrigerator having a misting apparatus according to the present invention.

FIG. 11 is a perspective view of a portion of conventional refrigerator 300 that includes a spray apparatus generally designated 301 according to the present invention. As is conventional, the refrigerator 300 includes a conventional refrigerant apparatus (not illustrated) for chilling air in the refrigerator. As is conventional, a door 302 closes a refrigerated compartment in which a vegetable crisper drawer 304 is slidingly received. The vegetable crisper drawer 304 includes a bottom 306 and sides 308. A back side 308a includes an opening 310 in an upper portion of the side. In the illustrated embodiment, the opening 310 is a slot that extends downwardly from an upper edge. The bottom 306 is preferably sloped to an opening 312 for a drain which receives a tube 314. The tube 314 matingly engages a second tube 316 attached to an inner wall 318 of the refrigerator. The tube 316 communicates with a remote drain or to a conventional evaporator drip pan below the refrigerator. In an alternate embodiment (not illustrated) a spring-biased valve is disposed in the opening 312. A pin in the tube 316 pushes against the valve to move it from a closed position to an open position when the vegetable crisper 304 is inserted fully into the refrigerator.

A sprayer 320 extends through the inner wall 318 of the refrigerator. The sprayer 320 connects through a tube 322 to a source of water. In the illustrated embodiment, the tube 322 connects to a valve 324. In a preferred embodiment, the valve 324 is actuated by a solenoid. The inlet side of the valve 324 connects to a tube 326 which communicates with a supply of water. For example, the supply of water may be a water line in a house which is tapped with a conventional saddle-T (not illustrated) for communicating water to the valve, for example, to an ice maker water line. In an alternate embodiment (not illustrated) the tube 322 connects to a pump which receives water from a separate supply container placed in the refrigerator. The spray apparatus 301 includes the timer 226 mounted in the refrigerator. The power for operating the time 226 and the solenoid-actuated valve 324 is provided by the power supply for the refrigerator.

The spray-emitting apparatus illustrated in FIG. 8 is used in a vegetable crisper. For example, the housing 200 inserts into a vegetable crisper drawer of a refrigerator. In the alternative, it inserts into a portable, closable container for fruits and vegetables for carrying in a car or to picnics. The reservoir 202 is filled with water and the timer 226 started by operating the switch 228. The timer 226 actuates the pump 210 at predetermined intervals for a predetermined period of time. The water is communicated from the reservoir 202 through the tube 212 to the intake 214 of the pump. The intake of the pump is preferably below the level of the water in the reservoir 204, so that the pump 210 is self-primed. The water is communicated by the pump 210 through the tube 218 to the sprayer 222. The water under pressure is sprayed as a mist from the sprayer 222.

The housing 200 includes a false bottom 240. In a preferred embodiment, the housing 200 sits in a notch 246 on a side of the false bottom. The fruits and vegetables in the vegetable crisper sit on the false bottom 240. The water flows through openings 244 into the space between the bottom of the vegetable crisper and the false bottom 240. Occasionally the false bottom 240 and the housing 200 are removed from the vegetable crisper. The collected water is poured out of the vegetable crisper. The reservoir 202 is refilled. The false bottom 240 and the housing 200 then are reinserted into the vegetable crisper. The override switch 230 activates the pump 210 on demand, so that fruits and vegetables first inserted into the crisper can be selectively sprayed with a water mist.

The alternate embodiment illustrated in FIG. 9 separates the water reservoir 202 from the housing 200. In this embodiment, the bag 260 attaches by the hook 262 to the side 254 of the crisper drawer 250. In this embodiment, a prepackaged supply of water is readily attached by connecting the tube 264 to the intake 214 of the pump 210. The operation of the mist-emitting apparatus in the housing 200 is as described above with respect to FIG. 8.

In the embodiment illustrated in FIG. 10, the cavity 272 defining the water reservoir 202 is integral with the vegetable crisper drawer 270. In an alternate embodiment (not illustrated) the cavity 272 forms a slidable cap that covers and closes the vegetable crisper. The cover 274 is opened to fill the cavity 272 with water. The water communicates through the tube 275 to the intake 214 of the pump 210. The operation of the misting apparatus is as discussed above with respect to FIG. 8. The water that collects in the bottom of the crisper drawer 270 flows to the drain 278. The water flows through the opening 280 into the tube 284 which communicates with a drain or drip pan below the refrigerator.

With reference to FIG. 11, the operation of the misting apparatus 301 is described. Water is communicated from the supply to the sprayer 320 for spraying as a mist into the vegetable crisper drawer 304. The timer 226 activates the solenoid to open the valve 324. The water passes through the valve 324 into the tube 322 for communicating to the sprayer 320. In the illustrated embodiment, the valve 324 connects to a conventional municipal water supply that is under pressure. The water sprayed into the drawer 304 collects on the bottom 306 and flows through the drain 312 to the drip pan below the refrigerator.

The vegetable crisper drawer 304 in a conventional refrigerator slides on rails in and out of the refrigerator for access the fruits and vegetables held in the drawer. When the drawer 304 is removed, the tube 314 detaches from the tube 316. Upon reinsertion of the drawer, the tube 314 connects to the tube 316.

The specification has thus described various embodiments, including a preferred embodiment, of the present invention, including the assembly and use thereof. It is to be understood, however, that numerous changes and variations may be made in the construction of the present invention. It should therefore be further understood that modification of the present invention may be made without departing from the scope thereof as set forth in the appended claims.

I claim:

1. A mist-emitting apparatus for a vegetable crisper for maintaining the freshness of fruits and vegetables held therein, comprising:

a housing for being removably received within a vegetable crisper having a sprayer attached to an upper portion of the housing;

a reservoir integral with the housing for holding a supply of water;

a cover for closing the reservoir after being filled with water;

a pump disposed in the housing and operatively communicating for self-priming with a lower portion of the reservoir for communicating a portion of the water under pressure to the sprayer at predetermined intervals for a predetermined period of time; and a controller and power supply mounted in the housing for operating the pump at the predetermined intervals;

whereby the water, being communicated to the sprayer, is emitted as a mist over the vegetables and restricted by the cover from reentry to the reservoir.

2. A mist-emitting apparatus as recited in claim 1, further comprising a false bottom extending laterally from a lower portion of the housing, whereby fruits and vegetables, being supported on the false bottom, are held above the water that collects below.

3. A mist-emitting apparatus for a vegetable crisper for maintaining the freshness of fruits and vegetables held therein, comprising:

a housing for being received in a vegetable crisper and having a sprayer attached to an upper portion of the housing;

a container separate from the housing having a supply of water in communication through a tube with a lower portion of the housing;

a cap received by an opening of the container for closing the container after filling with water;

a pump disposed in the housing vertically spaced below a surface level of the water and connected to the tube for self-priming with the water from the container for communicating a portion of the water to the sprayer under pressure at predetermined intervals for a predetermined period of time; and a controller and power supply mounted in the housing for operating the pump at the predetermined intervals;

whereby the water, being communicated to the sprayer, is emitted as a spray and prevented from recycling back into the reservoir by a cover closing the container.

4. The mist-emitting apparatus as recited in claim 3, further comprising a false bottom extending laterally from a lower portion of the housing, whereby fruits and vegetables, being supported on the false bottom, are held above the water that collects below.

5. The mist-emitting apparatus as recited in claim 3, further comprising a hanger attached to the container to hold the container to a wall of the vegetable crisper.

6. A vegetable crisper for a refrigerator to maintain the freshness of fruits and vegetables held therein, comprising:

a container having sides and a bottom surface for being received in a refrigerator;

a cavity for receiving a supply of water, the cavity formed integral in a wall of the container;

a cap for closing the cavity after filling with water;

a housing having a sprayer attached to an upper portion disposed in the container;

a pump having an inlet connected by a tube to a lower portion of the cavity for self-priming the pump and an outlet connected to the sprayer; and a controller for selectively communicating water from the cavity to the sprayer at predetermined intervals for a predetermined period of time, whereby the water, being communicated to the sprayer, is emitted as a mist and is restricted by the cap from recycling into the cavity.

7. A mist-spraying apparatus disposed in a refrigerator having at least a refrigerant apparatus for chilling air in an insulated chamber for maintaining articles at a chilled temperature and having a closable vegetable crisper drawer received in a portion of the chamber, comprising:

a crisper drawer adapted for being received in a refrigerator for holding fruits and vegetables;

a sprayer attached to an interior wall of the refrigerator and extending into the crisper drawer;

a supply of water connected to the sprayer by a tube;

means for communicating water self-primed and under pressure to the sprayer at predetermined intervals for a predetermined period; and a drain in a lower portion of the crisper drawer for collecting the misted water for discharge to a drain tube in the refrigerator, whereby water, being communicated to the sprayer, is emitted as a mist into the vegetable crisper drawer and discharged through the drain without recycling into the supply of water.

8. The mist-spraying apparatus as recited in claim 7, wherein the means for communicating comprises:

a valve connected to a supply of water;

a solenoid for selective actuation of the valve;

means for actuating the valve at the predetermined interval for the predetermined period.

9. The mist-spraying apparatus as recited in claim 7, wherein the crisper drawer includes an opening for receiving the sprayer that extends from the interior wall of the refrigerator.

10. The mist-spraying apparatus as recited in claim 9, wherein the opening is a slot defined at an edge of a wall of the vegetable crisper.

11. The mist-spraying apparatus as recited in claim 7, wherein the vegetable crisper includes a bottom that slopes to a drain for discharging water collected from the spray.

12. The mist-spraying apparatus as recited in claim 11, wherein the bottom defines a surface of ridges and valleys for holding fruit and vegetables on the ridges above water that collects in the valleys.

* * * * *